United States Patent [19]

Salee

[11] 4,187,259

[45] Feb. 5, 1980

[54] POLYMER BLENDS WITH IMPROVED HYDROLYTIC STABILITY COMPRISING A LINEAR AROMATIC POLYESTER AND A METHACRYLATE CROSS-LINKED ACRYLATE COPOLYMER

[75] Inventor: Gideon Salee, Williamsville, N.Y.

[73] Assignee: Hooker Chemicals & Plastics Corp., Niagara Falls, N.Y.

[21] Appl. No.: 920,891

[22] Filed: Jun. 30, 1978

[51] Int. Cl.$^2$ ............................................. C08L 67/06
[52] U.S. Cl. ............................ 525/219; 260/29.7 NR; 260/29.7 RP; 260/42.18; 525/221; 525/224
[58] Field of Search ....... 260/873, 29.7 NR, 29.7 RP, 260/42.18

[56] References Cited

U.S. PATENT DOCUMENTS

| | | | |
|---|---|---|---|
| 3,471,441 | 10/1969 | Hindersinn | 528/176 |
| 3,591,659 | 7/1971 | Brinkmann et al. | 260/873 |
| 3,594,450 | 7/1971 | Herwig et al. | 264/328 |
| 3,655,825 | 4/1972 | Souder et al. | 260/884 |
| 4,086,296 | 4/1978 | Carty et al. | 260/873 |

*Primary Examiner*—Maurice J. Welsh
*Attorney, Agent, or Firm*—Peter F. Casella; James F. Mudd; David A. Stein

[57] ABSTRACT

Polymer blends having improved hydrolytic stability comprise, in admixture, (1) a linear aromatic polyester prepared from an aromatic dicarboxylic acid and a bisphenol, and (2) a cross-linked acrylate-methacrylate copolymer. The blends are useful in preparation of films and molded articles.

32 Claims, No Drawings

POLYMER BLENDS WITH IMPROVED HYDROLYTIC STABILITY COMPRISING A LINEAR AROMATIC POLYESTER AND A METHACRYLATE CROSS-LINKED ACRYLATE COPOLYMER

BACKGROUND OF THE INVENTION

This invention relates to blends of enhanced hydrolytic stability containing linear aromatic carboxylic polyesters comprising a bisphenol wherein the carboxylic acid component can be an aromatic dicarboxylic acid or an aliphatic saturated dicarboxylic acid such as oxalic or adipic acids. More particularly the invention relates to such polymer blends which contain in admixture with said polyester a cross-linked acrylate-methacrylate copolymer and which are stabilized toward hydrolytic degradation.

Linear aromatic polyesters prepared from dicarboxylic acids, especially from aromatic dicarboxylic acids, and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to aritcles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding apparatus (i.e. less than about 300° C.) This type of glycol-modified polyester is more fully disclosed in U.S. Pat. No. 3,471,441, to Hindersinn et al.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would significantly limit their commercial utility in applications such as in autoclaves or at elevated temperatures in humid atmospheres.

It is known to add polymers and copolymers of acrylic and methacrylic esters of aliphatic and cycloaliphatic alcohols to a linear saturated aromatic polyester, derived from an aliphatic or cycloaliphatic glycol, to enhance the impact resistance of the polyesters.

Thus, for example, L. Brinkman et al., U.S. Pat. No. 3,591,659 discloses mixtures containing a linear saturated aromatic polyester derived from (1) a saturated aliphatic and cycloaliphatic diol and an aromatic dicarboxylic acid (optionally containing a small quantity of aliphatic dicarboxylic acid) and (2) about 0.05% to 25% by weight (calculated on the weight of the mixture) of a polymer of acrylic, methacrylic, or ethacrylic acid esterfied with a saturated aliphatic or cycloaliphatic alcohol, said mixtures having improved impact resistance. The mixtures contain polyesters derived exclusively from aliphatic and cycloaliphatic glycols (e.g. polyesters such as polyethylene terephthalate) which are known to be distinctive from the present bisphenol-derived polyesters. The reference does not disclose polyesters which are stabilized to hydrolysis and does not disclose that the addition to a polyester of a cross-linked acrylate-methacrylate copolymer as described by this invention.

Also, U.S. Pat. No. 3,594,450 of W. Herwig et al. discloses mixtures of linear saturated aromatic polyesters of the type described in the aforementioned Brinkman et al. patent, and 0.05% to 25% by weight (based on the weight of the mixture) of copolymers of esters of acrylic, methacrylic or ethacrylic acid and a saturated aliphatic or cycloaliphatic alcohol and a conjugated aliphatic diene e.g. 1,3 butadiene. The compositions of the patent have enhanced resistance to impact. As in the case of the preceeding Brinkman et al. patent, this patent relates to linear saturated aromatic polyesters known to be distinctive in properties from the bisphenol-derived polyesters of the invention and does not disclose that the compositions of the patent are stabilized toward hydrolysis. The patent also does not disclose addition to a polyester of a cross-linked acrylate-methacrylate copolymer.

Accordingly, it is a principal object of this invention to provide aromatic polyester compositions which are substantially stabilized toward hydrolysis while retaining the superior physical and chemical properties of the polyester.

SUMMARY OF THE INVENTION

It is found in accordance with the invention that admixture of certain copolymers of alkyl esters of acrylic acid and substituted acrylic acids, e.g. methacrylic acid, with an aromatic polyester of a bisphenol provides compositions which are substantially stabilized toward hydrolysis.

More particularly, the invention provides a thermoplastic polymeric composition comprising in admixture (a) a linear aromatic polyester of a bisphenol and a dicarboxylic acid and (b) a heterogeneous cross-linked acrylate-methacrylate copolymer produced by emulsion polymerization of a monomer reactant which is predominantly a lower alkyl methacrylate to form a hard methacrylate polymer in intimate contact with a soft cross-linked acrylate polymer produced by emulsion polymerization of a monomer reactant which is predominantly a lower alkyl acrylate and a diethylenically unsaturated cross-linking monomer, said methacrylate polymer and said cross-linked acrylate polymer being produced from substantially the same reaction mixture micelles.

The composition of the invention is a polyblend substantially resistant to hydrolysis as shown by an excellent retention of tensile strength on immersion of the present composition in boiling water of neutral pH for one week. At relatively low concentrations of the acrylatemethacrylate polymer in the present compositions (e.g. about 5% based on the total weight of polyester and copolymer) the loss in tensile strength on such immersion is generally less than about 12% (as shown in Example 3 below). At somewhat higher concentrations of the acrylate-methacrylate copolymer (e.g. about 10% or higher), the tensile strength of the present composition on immersion is unchanged or is even slightly enhanced (as shown in Example 4 below). In contrast under the same immersion conditions, the tensile strength of the polyester, devoid of the acrylate-methacrylate polymer, is degraded by as much as about 75% (as shown in Control Example 5 below). Other important beneficial properties of the polyester (such as the heat distortion temperature and the impact resistance) are substantially unchanged upon admixture of the polyester with the cross-linked acrylate-methacrylate copolymer in accordance with the invention.

DESCRIPTION OF THE PREFERRED EMBODIMENTS

Preparation of Linear Aromatic Polyester

The linear carboxylate aromatic polyesters of the present invention can be prepared by condensing a diacid halide of a dicarboxylic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

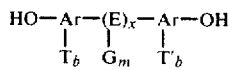

wherein Ar is aromatic, preferably containing 6–8 carbon atoms (including phenyl, biphenyl and napthyl); G is alkyl, haloalkyl, aryl, haloaryl, alkylaryl, haloalkyaryl, arylalkyl, haloarylalkyl, cycloalkyl, or halocycloalkyl; E is a divalent(or di-substituted) alkylene, haloalkylene, cycloalkylene, halocycloalkylene, arylene, or haloarylene, —O—, —S—, —SO—, —SO₂—, —SO₃—, —CO—,

or GN<; T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane, (4-hydroxyphenyl-, 2-hydroxyphenyl)-methane, and mixtures thereof; bis(4-hydroxy-3,5-dichlorophenyl)methane, bis(4-hydroxy-3,5-dibromophenyl)methane, bis(4-hydroxy-3,5-difluorophenyl)methane, bisphenol-A [bis(4-hydroxyphenyl)-2,2-propane]bis-(4-hydroxy-3,5-dichlorophenyl)-2,2-propane, bis(3-chloro-4-hydroxyphenyl)-2,2-propane, bis(4-hydroxynaphthyl)-2,2-propane, bis(4-hydroxynaphthyl)-2,2-propane, bis(4-hydroxyphenyl)-phenyl methane, bis(4-hydroxyphenyl) diphenyl methane, bis(4-hydroxyphenyl)-4'-methyl phenyl methane, bis(4-hydroxyphenyl)-4'-chlorophenyl methane, bis(4-hydroxyphenyl)-2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxynaphthalenes, bis(4-hydroxyphenyl)-2,2-butane, bis(2,6-dichloro-4-hydroxyphenyl)-2,2-propane, bis(2)methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-tertiary butylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl) sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl) propane, 4,4'-(cyclomethylene) bis-(2,6-dichlorophenol; 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl-hexane, 4,4'-dihydroxy-3,3',5,5'-tetrachlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propane, tetra-chlorodiphenylolsulfone, bis(3,5-dibromo-4-hydroxyphenyl)-phenyl phosphine oxide, bis(3,5-dibromo-4-hydroxyphenyl) sulfoxide, bis(3,5-dibromo-4-hydroxyphenyl)sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octochloro-4-4'-dihydroxy biphenyl. Representative biphenols are o,o'-biphenol, m,m'-biphenol; p,p'-biphenol; bicresols, such as 4,4'-bi-o- cresol, 6,6'-bi-o-cresol, 4,4'-bi-m-cresol; dibenzyl biphenols such as a,a'-diphenol-4,4'-bi-o-cresol; diethyl biphenols such as 2,2'-diethyl-p,p'-biphenol, and 5,5'-diethyl-o,o'-biphenol; dipropyl biphenols such as 5,5'-dipropyl-o,o'-biphenol and 2,2'-diisopropyl-p,p'-biphenol; dially biphenols such as 2,2'-diallyl-p,p'-biphenol; and dihalobiphenols, such as 4,4'-dibromo-o,o'-biphenol. Mixtures of isomers of the foregoing bisphenols can be used.

The dicarboxylic acids which are useful in this process are also well known and are represented by the formula:

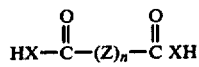

in which X is oxygen or sulfur, Z is alkylene, —Ar— or —Ar—Y—Ar—where Ar has the same definition as given with respect to the bisphenols, Y is a alkylene, of 1 to 10 carbons, haloalkylene, —O—, —S—, —SO—, —SO$_2$—, —SO$_3$—, —CO—,

or GN<; and n is 0 or 1.

Suitable dicarboxylic acids include aromatic dicarboxylic acids such as phthalic acid, isophthalic acid, terephthalic acid, bis(4-carboxy)-diphenyl, bis(4-carboxyphenyl)-ether, bis(4-carboxyphenyl)-sulfone, bis(4-carboxyphenyl)-carbonyl, bis(4-carboxyphenyl)-methane, bis(4carboxyphenyl)-dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1,1-dimethyl propane, 1,1- and 2,2-bis(4-carboxyphenyl)-butane, 1,1- and 2,2-bis(4-carboxyphenyl)-pentane, 3,3-bis(4-carboxyphenyl)-heptane, 2,2-bis(4-carboxyphenyl)-heptane, and aliphatic acids such as oxalic acid, adipic acid, succinic acid, malonic acid, sebacic acid, glutaric acid, azelaic acid, suberic acid and the like.

The preferred aromatic polyesters of this invention are prepared from bisphenols and at least one aromatic dicarboxylic acid, most preferably selected from the group consisting of isophthalic acid, terephthalic acid, or mixtures thereof. Isophthalic acid and terephthalic acid are preferred due to their availability and low cost. Most preferably, the dicarboxylic acid component comprises a mixture of about 75 to about 100 mol percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacid halide of a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. preparatory process correspond to those described above. The aliphatic modifier is a reactive difunctional component which may be represented by the formula:

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkylene-carboxyalkyl, and poly(alkylene carboxyalkylene-carboxy)alkyl; and n is an integer from 1 to 2 with n being 2 when D and D' is N. Typical examples of aliphatic modifiers having the foregoing formula include ethylene glycol, diethylene glycol, neopentyl glycol, 1,4-cyclohexane dimethanol, 1,4-butane dithiol, dipropylene glycol, polypropylene glycol, 1,1-isopropylidene bis(p-phenyleneoxy)di-2-ethanol, 2,2,4,4-tetramethyl-1,3-cyclobutanediol, bis(4-hydroxycyclohexane)-2,2-propane, di(hydroxyethyl) adipate, di(hydroxypropyl) glutarate, di(hydroxyethyl) poly(ethylene glycol)adipate, ethane dithiol, ethanolamine, methylethanolamine, hexamethylenediamine, 1,3-propanediol, 2-mercaptoethanol, and 2-aminopropanethiol. Combinations of the above-described aliphatic modifiers can also be employed, usually to obtain special properties.

Solution processes can also be employed in the preparation of suitable aromatic polyesters, such as disclosed in U.S. Pat. Nos. 4,051,107 and 4,051,106, the disclosures of which are incorporated herein by reference.

The polyester components of the invention are preferably prepared by a process, described as melt polymerization, involving an ester interchange, i.e. transesterification, reaction, between a diphenolic reactant and a diaryl ester of a dicarboxylic acid carried out in the melt (i.e. without use of a reaction solvent or diluent). Such a process is described in British Pat. No. 924,607, to Imperial Chemical Industries Limited, the disclosure of which is incorporated herein by reference.

A further melt polymerization process which can be used to prepare linear aromatic polyesters suitable for use in this invention is described and claimed in copending application Ser. No. 818,493, filed July 25, 1977, as a continuation-in-part of application Ser. No. 542,635, filed Jan. 20, 1975, now abandoned. This process basically comprises first mixing a bisphenol, a diaryl ester of a dicarboxylic acid and a diol, and then reacting the resulting mixture in the presence of a transesterification catalyst. The disclosure of the aforementioned pending application is incorporated herein by reference.

DESCRIPTION OF THE CROSSLINKED ACRYLATE-METHACRYLATE COPOLYMER

The acrylate-methacrylate copolymer employed in admixture with the present linear aromatic polyester according to the invention is a heterogeneous crosslinked acrylate-methacrylate copolymer produced by emulsion polymerization of a monomer reactant which is predominantly a lower alkyl methacrylate to form a hard methacrylate polymer in intimate contact with a soft cross-linked acrylate polymer produced by emulsion polymerization of a monomer reactant which is predominantly a lower alkyl acrylate and a diethylenically unsaturated cross-linking monomer, said methacrylate polymer and said cross-linked acrylate polymer being produced from substantially the same reaction mixture micelles. (Lower alkyl in the specification and claims of this application signifies a straight or branched chain saturated alkyl group of 1 to 8 carbon atoms such as methyl, ethyl, n-propyl, isopropyl, n-butyl and n-octyl).

Desirably the lower alkyl acrylate monomer reactant employed in preparing the soft acrylate polymer of the present copolymer is a $C_2$ to $C_8$ alkyl acrylate or a mixture of at least 80% of said lower alkyl acrylate with a comonomer copolymerizable therewith which contains a single vinylidene group, (i.e. the group $CH_2=C<$). Examples of suitable comonomers for use with the acrylate monomer include the following illustrative examples: lower alkyl methacrylic esters, such as methyl, ethyl or n-propyl methacrylate, acrylic and methacrylic acids and nitriles, vinyl toluene and the like. Desirably only monomers, which when polymerized, yield a polymer with a glass transition temperature below 0° are employed in the preparation of the soft acrylate polymer. Preferred suitable alkyl acrylate monomers are ethyl acrylate, 2-ethylhexyl acrylate and especially n-butyl acrylate.

The cross-linking monomer employed in the preparation of the present acrylate-methacrylate polyester is an unsaturated organic compound characterized in having two ethylenically unsaturated carbon to carbon bonds. Generally the two ethylenically unsaturated substituents of the crosslinking monomer are not in conjugation with each other through an aliphatic chain. Typical illustrative examples of suitable crosslinking monomers include the following examples: divinylbenzene, divinyl esters of di- or tribasic acids (such as divinyl adipate or the divinyl ester of 1,3,5 benzene tricarboxylic acid), diallyl esters of polyfunctional acids (diallyl phthalate), divinyl ethers of polyhydric alcohols (such as the divinyl ether of ethylene glycol), and di- and tri-methacrylic and acrylic esters of polyhydric alcohols (such as ethylene glycol, 1,2- and 1,3-propylene glycol, 1,3-butylene glycol, 1,4-butylene glycol, 1,6-hexane diol, which are di-esterified with acrylic or methacrylic acids, or glycerol di- or triesterified with acrylic or methacrylic acids). Particularly preferred as crosslinking monomers are the di- and triesters of the aforementioned polyhydric alcohols with acrylic and methacrylic acids since the latter crosslinking monomers polymerize well with acrylic esters and impart better heat stability to the final copolymer product. Especially preferred as crosslinking monomers are the diacrylic and dimethacrylic esters of 1,3-butylene glycol, i.e. 1,3-butylene diacrylate, 1,3-butylene dimethacrylate, and the mixed ester of acrylic acid and methacrylic acid with 1,3-butylene glycol.

Desirably the lower alkyl methacrylate monomer reactant employed in preparing the hard methacrylate polymer of the present copolymer is a $C_1$ to $C_4$ alkyl methacrylate or mixture of at least 80% of said lower alkyl methacrylate with a comonomer, copolymerizable therewith which contains a single vinylidene group. Examples of suitable comonomers for use with the methacrylate monomer include the following illustrative examples: lower alkyl acrylic esters, such as methyl, ethyl or n-propyl acrylate, acrylic and methacrylic acids and nitriles, vinyl toluene and the like. Desirably only monomers, which when polymerized, yield a polymer with a glass transition temperature of at least 20° are employed in the preparation of the hard methacrylate polymer.

The proportion of the aforementioned acrylate monomer reactant to the aforementioned methacrylate monomer reactant can vary broadly from about 5% to about 95% for the methacrylate monomer reactant and from about 95% to about 5% for the acrylate monomer reactant. Preferably about 50% to about 15% of methacrylate monomer reactant and about 50% to about 85% of the acrylate monomer reactant, and especially about 60% to about 20% of the methacrylate monomer reactant and about 40% to about 80% of the acrylate monomer reactant are employed.

The proportion of the crosslinking monomer employed in preparing the acrylate-methacrylate copolymer of the present invention is in general about 0.05% to about 10% based on the weight of the acrylate polymer and preferably is 0.1% to 5% based on the weight of the acrylate polymer.

The present acrylate-methacrylate polymer is prepared by a conventional aqueous emulsion addition polymerization technique employing a conventional free radical-generating, oil-soluble, water insoluble initiator for emulsion polymerization such as diisopropylbenzene hydroperoxide-sodium formaldehyde sulfoxylate, and a conventional emulsifier for emulsion polymerization, e.g. sodium lauryl sulfate.

In preparing the present crosslinked acrylate-methacrylate copolymer, the acrylate monomer reactant is first polymerized according to the emulsion mode in the presence of the crosslinking monomer to form an aqueous latex of crosslinked acrylate polymer. The methacrylate monomer reactant is then added to the emulsion polymerization mass containing said preformed crosslinked acrylate polymer-containing latex and is polymerized by the emulsion mode in intimate contact with the crosslinked acrylate polymer. In order that the methacrylate polymer and the acrylate polymer be formed from substantially the same reaction mixture micelles, the concentration of the emulsifier is at a low concentration during the polymerization of methacrylate monomer reactant, i.e. below the critical concentration of emulsifier required to form a substantial number of new emulsion polymerization micelles during the polymerization of the methacrylate monomer reactant, so that the formation of the methacrylate polymer as particles separate from the particles of crosslinked acrylate polymer is substantially prevented. In other words, the methacrylate polymer forms substantially from the micelles which produced the crosslinked acrylate polymer. While the aforementioned critical concentration of emulsifier varies with the particular polymer being made and the particular emulsifier employed, the critical concentration of emulsifier employed for preparation of the present copolymer is typically about 0.5% to about 1% based on the combined weight of the acrylate monomer reactant and the methacrylate monomer reactant. If it is desired to add additional amounts of emulsifier during the polymerization of methacrylate monomer reactant, the added amounts of emulsifier together with amount of emulsifier used to prepare the acrylate polymer should be below the aforementioned critical concentration of the emulsifier.

The technique of preparing the present crosslinked acrylate-methacrylate copolymer is more particularly described in L. C. Souder et al. U.S. Pat. No. 3,655,825, the disclosure of which is incorporated herein by reference.

The proportion of the crosslinked acrylate-methacrylate polymer employed in the composition of the invention is a minor proportion, i.e. less than about 50% based on the combined weight of the linear aromatic polyester and the crosslinked acrylate-methacrylate copolymer. Preferably, the acrylate-methacrylate copolymer is present in a proportion of about 1% to about 40% and especially of about 5% to about 20% based on the combined weight of the linear aromatic polyester and the crosslinked acrylate-methacrylate copolymer.

OPTIONAL ADDITIVES

The thermoplastic polymeric compositions of the invention, optionally, may include various additives such as organic impact modifiers (i.e. impact resistance enhancement agents) organic processing aids, flame retardants, organic or inorganic fillers, stabilizers and anti-static agents.

According to a particular embodiment of the invention (as illustrated in Example 7 below), the composition may contain a minor proportion of a lower alkyl methacrylate homopolymer such as polymethyl methacrylate as an impact modifier and as a processing aid. Preferably the methacrylate polymer (which is distinct from the crosslinked acrylate-methacrylate polymer of the invention) is employed in a proportion of about 1% to about 40% based on the combined weight of the polyester and crosslinked acrylate-methacrylate copolymer components of the present blend.

As flame retardants there can be used the linear aromatic polyester of a dicarboxylic acid and a bisphenol containing at least one carbon atom substituted with halogen which additive is described in copending U.S. application Ser. No. 863,381, filed Dec. 22, 1977, the disclosure of which is incorporated herein by reference. Preferably the aforementioned halogen substituted polyester includes an aliphatic modifier as described hereinabove and is employed in the present composition in a proportion of about 1% to about 30% based on the combined weight of the present blend of polyester and crosslinked acrylate-methacrylate mixture. As is illustrated in Example 6 below, use of 1,6-hexane diol-modified-2,2-bis(4-hydroxy-3,5-dibromophenyl) propane-isophthalate-terephthalate as the halogen-substituted polyester flame retardant provides an especially good result.

As an alternative to use of a linear aromatic polyester of a dicarboxylic acid and a halogen-substituted bisphenol as flame retardant additive, the aforementioned halogen-containing bisphenol can be employed as the bisphenol which is used to prepare the polyester component of the blend of the present invention. According to this embodiment of the invention, use of a polyester containing about 1 mole percent to less than about 50 mole percent of a bisphenol having at least one carbon atom substituted with halogen (with the balance of the bisphenol components being substantially free of halogen) also provides an effective degree of flame retardance as is also described in the aforementioned U.S. application, Ser. No. 863,381.

As an alternative to use of the above described flame retardants, the halogen containing flame retardants disclosed in U.S. application Ser. No. 863,556, filed Dec. 22, 1977, (the disclosure of which is incorporated herein by reference) can also be employed in the present compositions.

The fillers which may be employed in the compositions of the invention are preferably particulate fillers such as particulate glass (e.g. chopped glass fiber, glass rovings, glass microballoons or microspheres and pulverulent glass) particulate clay, talc, mica, inorganic natural fibers, synthetic organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particulate filler employed in the compositions of the invention is in the range of about 5 to about 70 weight percent, preferably about 5 to about 40 weight percent and especially about 8 to about 30 weight percent based on the combined weight of the polyester and the sulfonate polymer. The filler employed preferably is inorganic and more preferably is particulate glass and especially is glass fiber.

When the filler employed is particulate glass and especially is glass fiber, it is preferred that an organic coupling agent be present as a very thin coating on the glass particles. The coupling agent, which is preferably an organic silane, forms an adhesive bridge between the glass and the polymer blend thereby enhancing the strength properties of the filled polymer blend. Suitable coupling agents which can be employed with glass filler in the thermoplastic polymeric compositions of the invention are more particularly described in copending application Ser. No. 905,623, filed May 12, 1978.

The novel polymeric compositions of the instant invention are prepared by blending, in molten condition, the linear aromatic copolyester with the crosslinked acrylate-methacrylate copolymer. The blending or mixing process can be performed using conventional mixing equipment such as, for example, a Banbury mixer, roll mill, kneader, screw extruder, or injection molding machine.

When one or more of the above described additives is employed in the present composition, the additive-containing mixture of the invention may be prepared, if desired, by charging the additive to the polyblend formation step or mixing or blending the additive with the previously prepared polyblend in molten condition. The resultant additive-containing composition can then be processed to a film in a press or be molded directly in an injection molding apparatus or an extruder to shaped articles such as rods, rings, bars or the like. The films and molded articles thus formed are characterized by excellent hydrolytic stability with retention of substantially all of the beneficial properties of the original polyester.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts, proportions and percentages are by weight.

EXAMPLE 1—PREPARATION OF LINEAR AROMATIC POLYESTER (A) By Solution Polymerization To a reaction vessel equipped with agitation means which is purged of air and moisture by sweeping dry nitrogen through the vessel at 100° for four hours. A mixture of 165.7 parts isophthaloyl chloride, 29.2 parts of terephthaloyl chloride, 216.4 parts of bisphenol A and 3.8 parts of paratertiary butyl phenol, a reaction viscosity control agent, are dissolved in the reactor in 2270 parts of methylene chloride, which previously has been dried to a water content of 10 ppm. Over a period of 5.7 hours, 200.7 parts of triethyl amine catalyst are added under a nitrogen atmosphere at a constant rate to the agitated reaction mixture which is maintained at 15° during the addition. Upon completion of the addition, the reaction mixture is agitated for three hours at 20°. Dilute aqueous hydrochloric acid (57.0 parts, 0.5% solution) is then added to the reaction mixture in order to react with the triethylamine. After the reaction mixture has been agitated for an additional hour, the reaction mixture is allowed to stratify into an organic layer and an aqueous layer. After removal of the aqueous layer, the organic layer containing the product is continuously washed with deionized water until the concentration of chloride ion in the organic layer is less than 0.1 ppm. The polymer product is then precipitated from the organic layer and is collected. The polyester thus recovered is dried in a vacuum oven until the moisture content is less than 0.1%.

(B) By Melt (transesterification) Polymerization

Bisphenol-A (1319.1 g.), diphenyl terephthalate (275.9 g.) and diphenyl isophthalate (1562.9 g.) are dried for several hours at 75° in a vacuum oven and charged with 0.07 g. of anhydrous lithium hydroxide transesterification catalyst to a 5-liter resin kettle under nitrogen. The kettle is equipped with a thermometer, a nitrogen inlet on a Y-tube, a mechanical stirrer, a short Vigreaux column, a distillation head and 3 necked flask receiver.

The kettle is heated to 210° to melt the reactants and vacuum is applied gradually to the stirred molten mass. The temperature of the reaction mass is increased gradually to remove phenol overheat to the receiver. After 1.4 hours the temperature of the reaction mass reaches 228° and the reaction mass pressure is about 0.5 mm Hg. The reaction mass is then flooded with dry nitrogen to relieve the vacuum and the viscous reaction mass is poured into a foil-lined glass tray and allowed to cool to ambient temperature.

The bisphenol A-isophthalate-terephthalate prepolymer thus obtained is broken up and dried overnight at 70° in a vacuum oven. The dried prepolymer (1070 g.) is charged to a two gallon oil-heated stainless steel reactor equipped with agitation means under dry nitrogen and heated with agitation to 210°. Agitation of the molten mass is commenced after 1 hour. After 1.3 hours from the commencement of heating, vacuum (about 0.6 mm of Hg.) is applied to the agitated mass. The reaction temperature is raised gradually over a period of about 2 hours to 305°. The agitated reaction mass is then maintained under vacuum at 305° for 6.7 hours. The reactor is opened and the polyester obtained is discharged from the reactor and allowed to cool to ambient temperature. A clear yellow bisphenol A-isophthalate-terephthalate polyester having a relative viscosity of 1.36 (measured in tetrachloroethane at 30°) is obtained.

The foregoing procedure is repeated with 1100 g. of prepolymer being employed in the polymerization reaction. A similar polymer is obtained having a relative viscosity of 1.35 (measured in tetrachloroethane at 30°).

EXAMPLE 2—PREPARATION OF A LINEAR AROMATIC POLYESTER OF A HALOGEN-CONTAINING BISPHENOL

A mixture of 7.443 kg. of isophthaloyl chloride, 7.443 of terephthaloyl chloride and 227 kg. of methylene chloride are charged under an atmosphere of dry nitrogen to a 100 gallon glass lined Pfaudler reactor equipped with agitation means. In a 50 gallon glass lined Pfaudler reactor also equipped with agitation means and connected to a delivery tube to the previously described reactor, a mixture of 29.91 kg. of 2,2-bis(4-hydroxy-3,5 dibromophenyl) propane, 217. kg. of 1,6-hexane diol and 136 kg. of methylene chloride under an atmosphere of dry nitrogen is agitated to dissolve the halogen-containing bisphenol in the methylene chloride solvent. A 2 gallon addition tank also connected by a delivery tube to the larger Pfaudler reactor is charged with 22.5 liters of triethylamine under an atmosphere of dry nitrogen. The triethylamine and the bisphenol solution are added simultaneously over a period of 2 hours and 10 minutes to the mixture in the larger Pfaudler reactor, which is maintained at a temperature of about 13° to 19° under vigorous agitation. On completion of the addition of the bisphenol solution, the smaller Pfaudler reactor is rinsed with 45.4 kg. of methylene chloride and the methylene chloride rinse is added to the mixture in the larger Pfaudler reactor. The agitation of the reaction mixture in the larger Pfaudler reaction vessel was continued for about 14 hours.

About 2 liters of concentrated aqueous hydrochloric acid which has been diluted by addition of about 25 gallons of distilled water is then added to the reaction mixture in the larger Pfaudler reactor to terminate the esterification reaction. The resultant reaction mixture which consists of a lower organic liquid phase containing the polyester product and an upper aqueous phase is removed from the reaction vessel and the layers thereof are separated. The recovered organic layer is washed clean of chloride anion with water.

The polyester product is recovered by drowning the washed organic layer gradually in about 50 gallons of vigorously agitated water at about 60° to 70° in a vessel equipped with a bottom outlet. During the drowning operation the methylene chloride is flashed from the drowned mixture and the polyester precipitates as a white solid. The product is withdrawn from the aforementioned bottom outlet as an aqueous slurry which is centrifuged to separate the water from the solid product. The product is dried with agitation in vacuo at about 100° for about 16 hours. The recovered polyester is obtained in a yield of about 90% of theory.

The resultant polyester product contains the tetrabromo-bisphenol, 1,6-hexane diol, isophthalate and terephthalate residues in the molar proportions 0.75:0.25:0.5:0.5, has an intrinsic viscosity of 0.41, a glass transistion temperature of 198°–207°, a weight average molecular weight of 60,200 and a number average molecular weight of 21,400. By analysis the actual bromine content of the polyester product is 41.89% (theoretical: 42.2%).

EXAMPLE 3—PREPARATION OF BLEND OF SOLUTION LINEAR AROMATIC POLYESTER AND CROSSLINKED ACRYLATE-METHACRYLATE COPOLYMER

A powdery mixture is prepared by manually tumbling for 1 to 5 minutes 500 parts of the bisphenol A-isophthalate-terephthalate polyester of Example 1A above and 26.32 parts (corresponding to 10% based on the weight of the mixture) of a proprietary crosslinked acrylate-methacrylate prepared according to the process of the aforementioned U.S. Pat. No. 3,655,825 of L. C. Souder et al. which contains about 20% methyl methacrylate, about 80% butyl acrylate and about 0.2% of a crosslinking monomer selected from the group consisting of 1,3 butylene glycol dimethacrylate, 1,3 butylene glycol diacrylate, and 1,3 butylene glycol acrylate, methacrylate mixed ester (available from Rohm and Haas Co. under the designation 7709-XP). The resulting mixture is dried at 120° for four hours. A polyblend is then formed from the mixture by extruding the mixture in molten condition from Haake Extruder operating at the following conditions:

| | |
|---|---|
| Zone 1 Temperature | 280° |
| Zone 2 Temperature | 280° |
| Zone 3 Temperature | 280° |
| Zone 4 Temperature | 280° |
| Die Melt Temperature | 290° |
| RPM | 100 |
| Torque | 2500–3000 m.-g. |

The molten blend is extruded as a hot strand of about ⅛ inch average diameter which is chopped into pellets of about ⅛ inch length which are allowed to cool to ambient temperature while being dried over anhydrous calcium sulfate.

The dried pellets are injected molded as standard bars (⅛ inch thickness) for testing of tensile properties according to ASTM Test D-638 and as standard bars for the notched Izod Impact Test of ASTM D-256 and for determination of the Heat Distortion Temperature at 264 psi according to ASTM Test D-648. The molding is accomplished in an Arburg 221E/150 Molding Machine operating under the following conditions:

| | |
|---|---|
| Barrel Temperature | 600° F. |
| Injection Pressure (psi) | 15540 |
| Mold (Cavity) Temperature | 250° F. |

The heat distortion temperature and the Izod (notched) Impact resistance of the molded product are determined. A portion of the product bars are tested for tensile strength and tensile modulus (according to ASTM Test D-638). Another portion of the bars are tested for the aforementioned tensile properties after immersion for one week in water (of substantially neutral pH) boiling under reflux conditions. The product is readily combustible at ⅛ inch sample thickness so that the product is not further tested for flame retardance. The results of these tests are reported in the Table below.

EXAMPLE 4

The procedure of Example 3 above is repeated substantially as described except that amount of the crosslinked acrylate-methacrylate copolymer employed is 55.56 parts (corresponding to about 10% of the copolymer based on the combined weight of the copolymer and the polyester). The results of this example are also reported in the Table below.

EXAMPLE 5 (Control)

As a control the pure polyester of Example 1A is molded as described in Example 3 under the following operating conditions in the Haake Extruder and the Arburg Injection Molding Machine:

| Haake Extruder Conditions | | Arburg Injection Molding Machine Conditions | |
|---|---|---|---|
| Zone 1 Temperature | 280° | Barrel Temperature | 630° F. |
| Zone 2 Temperature | 280° | Injection Pressure (psi) | 16,650 |
| Zone 3 Temperature | 280° | | |
| Zone 4 Temperature | 280° | Mold (cavity) Temperature | 250° F. |
| Die Melt Temperature | 300° | | |
| RPM | 100 | | |
| Torque | 3000–5000 m.-g. | | |

TABLE

| PROPERTIES | EXAMPLE 5 Polyester of Ex. 1A (Control) | EXAMPLE 3 Polyester of Ex. 1A + 5% Crosslinked Acrylate-Methacrylate Copolymer | EXAMPLE 4 Polyester of Ex. 1A + 10% Crosslinked Acrylate-Methacrylate Copolymer |
|---|---|---|---|
| Prior to Boiling Water Immersion: | | | |
| Tensile Strength (psi) | 9900 | 9300 | 8500 |
| Tensile Modulus (psi × $10^5$) | 3.44 | 2.39 | 2.83 |
| Izod (notched) Impact Resistance (ft.lbs./in.) | 7.0 | 6.0 | 7.1 |
| Heat Distortion Temperature (at 264 psi) | 157° | 155° | 153.5° |
| Flame Retardance | — | unsatisfactory (burns readily at 1/8 inch sample thickness) | unsatisfactory (burns readily at 1/8 inch sample thickness) |
| After Boiling Water Immersion: | | | |
| Tensile Strength (psi) | 2500 | 8300 | 8900 |

| PROPERTIES | EXAMPLE 5<br>Polyester of<br>Ex. 1A<br>(Control) | EXAMPLE 3<br>Polyester of Ex.<br>1A + 5% Crosslinked<br>Acrylate-Meth-<br>acrylate Copolymer | EXAMPLE 4<br>Polyester of Ex. 1A<br>+ 10% Crosslinked<br>Acrylate-Methacrylate<br>Copolymer |
|---|---|---|---|
| Tensile Modulus (psi $\times 10^5$) | 3.0 | 3.09 | 2.93 |

The data compared in the Table above indicate that, in general, while blending of the polyester with a minor proportion of the crosslinked-acrylate-methacrylate copolymer additive according to the invention does not substantially detrimentally affect the original properties of the polyester, the tensile strength of the blend is substantially stabilized toward immersion of the molded blend in boiling neutral pH water. Thus according to Control Example 5, the pure polyester undergoes a loss of about 75% in tensile strength on immersion in boiling water for seven days whereas the product of the invention containing the polyester and 5% of the crosslinked acrylatemethacrylate polyester, under the same immersion conditions, loses only about 11% of the tensile strength if possessed prior to immersion. As indicated by the data of Example 4, the molded product of the invention containing about 10% of the crosslinked acrylate-methacrylate copolymer on immersion in boiling water for 7 days actually exhibits a substantial enhancement in tensile strength of about 4.5%.

EXAMPLE 6—PREPARATION OF A BLEND OF LINEAR AROMATIC POLYESTER AND CROSSLINKED ACRYLATE-METHACRYLATE COPOLYMER WITH ENHANCED FLAME RETARDANCE

The polyester of Example 1 above (450 parts) is dried for 4 hours at 120° and mixed by manual tumbling as described in Example 3 with 50 parts of the crosslinked acrylate-methacrylate copolymer described in Example 3 and 56 parts of the bromine-containing bisphenol polyester of Example 2, the latter two ingredients having been dried at 80° for four hours. A polyblend is then formed from the mixture (which contains the polyester and the crosslinked acrylate-methacrylate copolymer in a weight ratio of about 9:1) and about 10%, (based on the combined weight of the polyester and acrylate-methacrylate polymer), of the brominated bisphenol polyester by extruding the mixture in molten condition through the Haake Extruder of Example 3 which operates at the following conditions:

| Zone 1 Temperature | 300° |
|---|---|
| Zone 2 Temperature | 300° |
| Zone 3 Temperature | 300° |
| Zone 4 Temperature | 300° |
| Die Melt Temperature | 300° |
| RPM | 100 |
| Torque | 3000 to 4000 m.-g. |

The ⅛ inch diameter hot strand of extruded product is chopped into pellets of about ⅛ inch length which are allowed to cool to ambient temperature over anhydrous calcium sulfate substantially as described in Example 3. The resultant dried pellets are injected molded into appropriate sample bars for use in the ASTM tests described in Example 3 as well as for the flame retardance test in "UL-94-Standards for Safety" Underwriters Laboratory Inc., Second Revised Edition, May 2, 1975, pages 6–8, employing the Arburg Molding Machine described in Example 3 which operates at the following conditions:

| Barrel Temperature | 600° F. |
|---|---|
| Injection Pressure (psi) | 15,540 |
| Mold (cavity) Temperature | 250° F. |

The tensile strength, tensile modulus, Izod (notched impact resistance) and heat distortion temperature are measured and found to have the following excellent values:

| Tensile strength (psi) | 8200 |
|---|---|
| Tensile modulus (psi $\times 10^5$) | 2.75 |
| Izod (notched) Impact resistance (ft. lb./in.) | 5.4 |
| Heat Distortion Temperature | 156.6° |

The flame retardance is measured according to the aforementioned UL-94 test (wherein the ratings V-2, V-1 and V-0 represent in ascending order the flame retardance of the tested product, i.e. V-0 corresponds to the highest order of flame retardance). The product is rated as having a flame retardance of V-0 at ⅛ inch sample thickness. Since the substantially comparable product blend devoid of the halogen-containing polyester burns readily at ⅛ inch sample thickness (as indicated in the data of Example 4 in above Table), the latter product is considered to have an unsatisfactory UL-94 flame retardance rating even less than V-2. Accordingly, the present halogen-containing polyester product possesses substantially enhanced flame retardance compared to the blend according to the invention which contains the polyester and acrylate-methacrylate copolymer but which is devoid of the halogen-containing bisphenol moiety.

EXAMPLE 7—PREPARATION OF A BLEND OF LINEAR AROMATIC POLYESTER AND CROSSLINKED ACRYLATE-METHACRYLATE COPOLYMER CONTAINING AN IMPACT ENHANCEMENT AND PROCESSING AID ADDITIVE

Part A

A bisphenol A-isophthalate-terephthalate polyester (600 parts) prepared substantially as described in Example 1A is dried at 120° for four hours and manually mixed as described in Example 3 with 200 parts of the crosslinked acrylate-methacrylate polymer of Example 3 and 200 parts of a proprietary thermoplastic methyl methacrylate polymer (sold under the designation Plexiglas V-811 by Rohm and Haas Co.), the latter two ingredients having been dried for four hours at 80°. The weight ratio of the polyester, the acrylate-methacrylate copolymer and the polymethacrylate in the mixture is about 3:1:1. The mixture is blended by melt extrudsion as previously described in Example 3 employing a Haake Extruder operating at the following conditions:

| | |
|---|---|
| Zone 1 Temperature | 270° |
| Zone 2 Temperature | 270° |
| Zone 3 Temperature | 270° |
| Zone 4 Temperature | 270° |
| Die Melt Temperature | 290° |
| RPM | 90 |
| Torque | 3000 to 4000 m.-g. |

The resultant hot product strand of ⅛ inch average diameter is chopped into pellets which are dried and molded as sample bars as described in Example 6 above employing the previously described Arburg 221E/150 Injection Molding Machine operating at the following conditions:

| | |
|---|---|
| Barrel Temperature | 550° F. |
| Injection Pressure (psi) | 8880 |
| Mold (cavity) Temperature | 250° F. |

Part B

The procedure of Part A above is repeated substantially as described except that the amounts of polyester, crosslinked acrylate-methacrylate polymer and polymethyl methacrylate are respectively 500 parts, 300 parts and 200 parts (corresponding to a weight ratio of 5:3:2 of said components).

The tensile strength, tensile modulus, Izod (notched) impact resistance, and heat distortion temperatures of the Part A and Part B products are measured and are found to have the following excellent values:

| | Part A Product | Part B Product |
|---|---|---|
| Tensile Strength (psi) | 7700 | 6500 |
| Tensile Modules (psi × $10^5$) | 2.63 | 2.44 |
| Izod (notched) Impact resistance (ft.lb./in.) | 10.7 | 19.0 |
| Heat Distortion Temperature | 120.8 | 107.5 |

Comparison of the Izod (notched) impact resistance test results of the above products A and B with that of the pure polyester as determined in Control Example 5 indicates that a substantial enhancement of impact resistance is achieved when the polyester of the invention is blended with both the crosslinked-acrylate polymer and polymethyl methacrylate additive in accordance with this Example. In contrast the blends of the invention which contain the polyester and the crosslinked acrylate-methacrylate polymer but which are devoid of the polymethyl methacrylate exhibit about the same or slightly less impact resistance in comparison with the pure polyester (as is evident from a comparison of the Izod (notched) impact resistance results of Examples 3 and Example 4 with that of the pure polyester in Control Example 5.

Based on the generally lower operating conditions required to process the present Part A and Part B products in Haake Extruder and the Arburg Injection Molding Machine (as compared to the corresponding data for the pure polyester in Control Example 5 and the blend of the polyester and the crosslinked acrylate methacrylate copolymer in Example 3) the present blends of polyester, crosslinked acrylate-methacrylate copolymer and polymethyl methacrylate are more easily processed than either the pure polyester or the former binary blend. Accordingly, the methacrylate polymer additive of this example is seen to be an effective processing aid (as well as an effective impact modifier) for the compositions of the invention.

EXAMPLE 8

A blend of a melt-polymerization prepared bisphenol A-isophthalate-terephthalate polyester (prepared substantially as described in Example 1B) and the crosslinked acrylate-methacrylate copolymer described in Example 3 is prepared employing the proportions and preparatory substantially as described in Example 3. An excellent product substantially similar to that of Example 3 is obtained.

As will be evident to those skilled in the art, numerous variations and modifications can be made in the procedures of the following examples without departing from the spirit or scope of the invention. For example, instead of being molded to a shaped article as described above, the milled polyblend of the invention can be pressed into a film employing equipment and pressing conditions conventional for making thermoplastic films.

The invention has been described in the above specification and illustrated by reference to specific embodiments in the illustrative examples. However, it is to be understood that these embodiments are not intended to limit the invention since, as is illustrated above, changes and modifications in the specific details disclosed hereinabove can be made without departing from the scope or spirit of the invention.

What is claimed is:

1. A thermoplastic polymeric composition comprising in admixture; (a) a linear aromatic polyester of a bisphenol and a dicarboxylic acid and (b) the methacrylate-crosslinked acrylate copolymer recovered from the polymerization process which comprises emulsion-polymerizing a monomer reactant which is predominantly a lower alkyl acrylate monomer in the presence of a small effective amount of a diethylenically unsaturated cross-linking monomer to form a latex of a soft cross-linked lower alkyl acrylate polymer, adding to said latex a monomer reactant which is predominantly a lower alkyl methacrylate monomer and emulsion-polymerizing said lower alkyl methacrylate monomer to form a hard lower alkyl methacrylate polymer, said crosslinked lower alkyl acrylate polymer and said hard lower alkyl methacrylate polymer being produced from the same polymerization reaction mixture micelles.

2. The composition of claim 1 wherein said methacrylate polymer is produced by polymerizing about 50 to about 15 parts by weight of a $C_1$ to $C_4$ alkyl methacrylate or a mixture of at least 80% of said methacrylate monomer with a comonomer, copolymerizable therewith, which contains a single vinylidene group as its sole polymerizable reactive group and said cross-linked acrylate polymer is produced by polymerizing about 50 to about 85 parts by weight of a $C_2$ to $C_8$ alkyl acrylate or a mixture of at least 80% by weight of said acrylate monomer with a comonomer, copolymerizable therewith, which contains a single vinylidene group as its sole polymerizable reactive group and from about 0.05% to about 10% based on the weight of the acrylate polymer of the cross-linking monomer said methacrylate polymer having a glass transition temperature of at least 20° and said cross-linked acrylate polymer having a glass transition temperature below 0°.

3. The composition of claim 2 wherein said dicarboxylic acid has the formula:

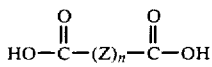

wherein Z is alkylene, —Ar— or —Ar—Y—Ar— where Ar is aromatic, Y is alkylene, haloalkylene, —O—, —S—, —SO$_2$—, —SO$_3$—, —CO—,

or GN<, wherein G is alkyl, haloalkyl, aryl, haloaryl, alkylaryl, haloalkylaryl, arylalkyl, haloarylalkyl, cycloalkyl or cyclohaloalkyl; and n is 0 or 1.

4. The composition of claim 3 wherein said dicarboxylic acid is an aromatic dicarboxylic acid.

5. The composition of claim 2 wherein said bisphenol has the formula:

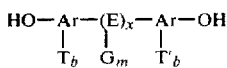

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

6. The composition of claim 5 wherein the bisphenol is bisphenol-A.

7. The composition of claim 1 wherein said linear aromatic polyester includes the residue of an aliphatic modifier.

8. The composition of claim 7 wherein said aliphatic modifier is a glycol of 2 to 100 carbon atoms.

9. The composition of claim 8 wherein said glycol is selected from the group consisting of neopentyl glycol, diethylene glycol, ethylene glycol, and mixtures thereof.

10. The composition of claim 6 wherein the cross-linking monomer is selected from the group consisting of dimethacrylic esters of polyhydric alcohols, trimethacrylic esters of polyhydric alcohols, diacrylic esters of polyhydric alcohols, and triacrylic esters of polyhydric alcohols.

11. The composition of claim 10 wherein the cross-linking monomer is a diester of a dihydric alcohol.

12. The composition of claim 11 wherein the cross-linking monomer is a diester of 1,3-butylene glycol.

13. The composition of claim 12 wherein the cross-linked acrylatepolymer is cross-linked poly-n-butyl acrylate and methacrylate polymer is poly-methyl methacrylate.

14. The composition of claim 13 wherein the cross-linked acrylate-methacrylate copolymer is present in a proportion of about 1% to about 40% based on the combined weight of said copolymer and the polyester.

15. The composition of claim 14 wherein the cross-linked acrylate-methacrylate copolymer is in a proportion of about 5% to about 20% based on the combined weight of said copolymer and the polyester.

16. The composition of claim 15 wherein the aromatic dicarboxylic acid of the polyester is selected from the group consisting of isophthalic acid, terephthalic acid, and mixtures thereof.

17. The composition of claim 16 wherein the cross-linking monomer is the diester of methacrylic acid and 1,3-butylene glycol.

18. The composition of claim 16 wherein the cross-linking monomer is the diester of acrylic acid and 1,3-butylene glycol.

19. The composition of claim 18 wherein the cross-linking monomer is the mixed ester of methacrylic acid and acrylic acid and 1,3-butylene glycol.

20. The composition of claim 1 wherein there is also present a minor proportion based on the combined weight of the heterogeneous cross-linked acrylate-methacrylate copolymer and the polyester of a lower alkyl methacrylate homopolymer.

21. The composition of claim 20 wherein said lower alkyl methacrylate homopolymer is polymethyl methacrylate present in a proportion about 1% to about 40% based on the combined weight of the heterogeneous cross-linked acrylate-methacrylate copolymer and the polyester.

22. The composition of claim 1 wherein the bisphenol component is a mixture of a bisphenol devoid of halogen substitution and a bisphenol containing at least one carbon atom substituted with halogen, said halogen-containing bisphenol being present in a proportion of about 1 mole percent to less than about 50 mole percent of the total bisphenol component.

23. The composition of claim 1 wherein the halogen-containing bisphenol is 2,2-bis(4-hydroxy-3,5-dibromophenyl) propane.

24. The composition of claim 23 wherein the polyester is a mixture of polyesters comprising:
(A) a polyester of said bisphenol devoid of halogen, and
(B) a polyester of said halogen-containing bisphenol.

25. The composition of claim 24 wherein the halogen-containing polyester includes an aliphatic modifier and is present in a proportion of about 1% to about 30% based on the combined weight of the cross-linked acrylate-methacrylate copolymer and the halogen-free polyester.

26. The composition of claim 25 wherein the halogen-containing polyester is a 1,6-hexane diol-modified-2,2-bis(4-hydroxy-3,5-dibromophenyl)propane-isophthalate-terephthalate copolyester.

27. The composition of claim 1 wherein the aromatic polyester is prepared by a melt polymerization process.

28. The composition of claim 1 which also includes a filler material.

29. The composition of claim 28 wherein the filler is glass fiber.

30. A thermoplastic polymeric composition comprising in admixture (a) a major proportion of a polyester selected from the group consisting of poly-(bisphenol A-isophthalate), poly-(bisphenol A-terephthalate) and bisphenol A-isophthalate-terephthalate copolyester and (b) a minor proportion of the polymerization product of components consisting essentially of (I) 60 to 20 parts by weight of a member from a first group consisting of (a) $C_1$ to $C_4$ alkyl esters of methacrylic acid and (b) mixtures of at least 80% by weight of a $C_1$ to $C_4$ alkyl methacrylate with another monomer which is copolymerizable therewith and which has a single vinylidene group as its sole polymerizable reactive group, the member from said first group having been emulsion polymerized to form a hard polymer having a glass transition temperature of at least 20° by carrying out the polymerization in intimate contact with (II) 40 to 80 parts by weight of a member selected from a second group consisting of (i) preformed rubbery polymers of $C_2$ to $C_8$ alkyl esters of acrylic acid and from 0.1 to 5% of a crosslinking monomer selected from the group consisting of dimethacrylic esters of polyhydric alcohols, trimethacrylic esters of polyhydric alcohols, diacrylic esters of polyhydric alcohols and triacrylic esters of polyhydric alcohols, the rubbery polymers having been formed in an emulsion with from 0.5 to 1% of the emulsifier present based on the final weight of both monomers charged, and having a glass temperature below 0° C., and (ii) copolymers of at least 80% by weight of said crosslinked alkyl acrylate with another monomer which is copolymerizable therewith and which has a single vinylidene group as its polymerizable reactive group.

31. A film formed from the composition of claim 1.

32. A molded article formed from the composition of claim 1.

* * * * *